No. 773,492. Patented October 25, 1904.

UNITED STATES PATENT OFFICE.

ROBERT ERNST ALWIN GANS, OF PANKOW, NEAR BERLIN, GERMANY.

IGNITION MATERIAL.

SPECIFICATION forming part of Letters Patent No. 773,492, dated October 25, 1904.

Application filed May 6, 1904. Serial No. 206,742. (No specimens.)

*To all whom it may concern:*

Be it known that I, ROBERT ERNST ALWIN GANS, chemist, a subject of the German Emperor, residing at Pankow, near Berlin, Germany, (whose post-office address is Parkstrasse 12, Pankow, near Berlin, Germany,) have invented a certain new and useful Ignition Material or Priming Composition Suitable for the Manufacture of Matches, of which the following is a specification.

Letters Patent No. 698,698 describes an ignition material for matches, consisting of a mixture of a substance which readily yields oxygen with a salt of a polythionic acid—viz., di, tri, tetra, or penta thionic acid. In practice it was found that the igniting materials produced according to the said patent have certain defects; and the present invention has for its object to produce an igniting or priming composition free from the said defects. Such a composition may be obtained by mixing certain compounds of sulfur and polythionates (hereinafter called "sulfo-polythionates") with a substance which will easily give off oxygen.

For producing these sulfo-polythionates I mix the polythionate with finely-divided sulfur and gently heat the mixture either dry or in the presence of water, or I grind the said mixture under pressure, during which operation the yellow color of the mixture changes into a reddish color, and if moisture is present the volume of the mixture increases considerably, which serves to prove that the product thus obtained is not a mere mechanical mixture of sulfur and polythionate, but a chemical compound. The proportions of the two constituents may vary between wide limits. Useful priming compositions have been obtained, for instance, by causing three parts of sulfur to act on ten parts of cupro-barium tetra-thionate and also by causing equal parts of the said constituents to act upon each other. Sulfo-polythionates are sparingly soluble in water. By hot water they are gradually decomposed while assuming a green to black color. In ammonia they are partly soluble while being decomposed and assuming a blue color. They resist atmospheric influences better than is the case with polythionates. When gently heated with a solution of glue, they will not precipitate the latter. In mixture with glue they gradually form a solid and hard mass. Potassium chlorate is more easily reduced by sulfo-polythionates than by polythionates. For preparing the new igniting or priming composition these sulfur compounds of polythionates prepared as described are mixed with oxygen-yielding substances, such as potassium chlorate.

The dipping-bath prepared from this mixture may be preserved in good condition for several days and is not sensitive to moderate heating. The heads of matches dipped into such a composition are very solid and easily ignitible on ordinary and also on very rough friction-surfaces, and the binding substance used in its manufacture need not be the expensive gelatin, but may be ordinary cheap glue. The heads of such matches burn off very quietly and slowly.

What I claim is—

1. The new igniting composition consisting of a sulfo-polythionate and an oxidizing agent, which sulfo-polythionate can be obtained from a polythionate and finely-divided sulfur by gently heating a mixture of the said materials, thereby changing the yellow color into reddish; the said sulfo-polythionate being sparingly soluble in water, capable of gradual decomposition by hot water, while assuming a green to black color, partly soluble in ammonia, while undergoing decomposition and assuming a blue color, resisting atmospheric influences better than the polythionates and not precipitating glue from a solution, when gently heated with the same; the said sulfo-polythionate gradually forming a hard solid mass when in mixture with glue, and reducing potassium chlorate more easily than polythionate, substantially as described.

2. The new igniting composition consisting of a sulfur compound of cupro-barium tetrathionate and potassium chlorate, which sulfur compound can be obtained from cuprobarium tetra-thionate and finely-divided sulfur by gently heating a mixture of the said materials, thereby changing the yellow color of the mixture into reddish, the said sulfur cupro-barium tetra-thionate being sparingly soluble in water, capable of gradual decomposition by hot water, while assuming a green-black color, partly soluble in ammonia, while undergoing decomposition and assuming a blue color, resisting atmospheric influences better than the polythionates and not precipitating glue from a solution, when gently heated with the same; the said cupro-barium tetra-thionate gradually forming a hard solid mass when in mixture with glue, and being more efficient than cupro-barium tetra-thionate as a reducing agent for potassium chlorate, substantially as described.

In witness whereof I have signed this specification in the presence of two subscribing witnesses.

ROBERT ERNST ALWIN GANS.

In presence of—
ROBERT WACHE,
HERMANN SÜHSENGUTT.